US012636719B2

(12) United States Patent
Lee et al.

(10) Patent No.:  US 12,636,719 B2
(45) Date of Patent:      May 26, 2026

(54) APPARATUS FOR CUTTING CURVED WALL OF REACTOR STRUCTURE

(71) Applicant: EGUN CO., LTD., Gwangju-si (KR)

(72) Inventors: Sung Jun Lee, Gwangju-si (KR); Chae Mun Lee, Seongnam-si (KR)

(73) Assignee: EGUN CO., LTD, Gwangju-si (KR)

( * ) Notice: Subject to any disclaimer, the term of this patent is extended or adjusted under 35 U.S.C. 154(b) by 210 days.

(21) Appl. No.: 18/701,825

(22) PCT Filed: Nov. 7, 2022

(86) PCT No.: PCT/KR2022/017347
§ 371 (c)(1),
(2) Date: Apr. 16, 2024

(87) PCT Pub. No.: WO2023/080744
PCT Pub. Date: May 11, 2023

(65) Prior Publication Data
US 2024/0416439 A1     Dec. 19, 2024

(30) Foreign Application Priority Data
Nov. 8, 2021     (KR) ........................ 10-2021-0152532

(51) Int. Cl.
*B23D 45/00*          (2006.01)
*B23D 47/12*          (2006.01)
(Continued)

(52) U.S. Cl.
CPC ........... *B23D 45/003* (2013.01); *B23D 47/12* (2013.01); *B28D 1/04* (2013.01); *G21D 1/003* (2013.01)

(58) Field of Classification Search
CPC ......... B28D 1/04; B28D 1/043; B23D 45/006
See application file for complete search history.

(56) References Cited

U.S. PATENT DOCUMENTS 1,221,401 A * 4/1917 Wilhelm et al. ......... B28D 1/04
83/743
2,081,360 A * 5/1937 Mall ...................... E01B 31/04
451/121
(Continued)

FOREIGN PATENT DOCUMENTS

JP          0586419          11/1993
KR     10-2009-0117439      11/2009
(Continued)

OTHER PUBLICATIONS

International Search Report and Written Opinion for International Application No. PCT/KR2022/017347, dated Nov. 7, 2022.

*Primary Examiner* — Sean M Michalski
(74) *Attorney, Agent, or Firm* — Fish IP Law, LLP; Tomas A. Prieto

(57)          ABSTRACT

An apparatus for cutting a curved wall of a structure, of the present invention, may comprise; a guide rail mounted on a curved wall of a structure; a chain mounted on the guide rail; a support plate supported by the guide rail so as to be movable by means of a plurality of rollers; a body case coupled to the support plate; a sprocket mounted at the body case so as to rotate while engaged with the chain; a driving motor mounted in the body case so as to rotate the sprocket; a cutting blade rotatably mounted at the front of the body case; and cutting motor mounted in the body case so as to rotate the cutting blade.

13 Claims, 11 Drawing Sheets

(51) Int. Cl.
    *B28D 1/04*        (2006.01)
    *G21D 1/00*        (2006.01)

(56)           References Cited

U.S. PATENT DOCUMENTS

| | | | | |
|---|---|---|---|---|
| 2,506,076 | A * | 5/1950 | Garrison | B28D 1/043 |
| | | | | 83/485 |
| 2,804,065 | A * | 8/1957 | Ghiglieri | B28D 1/30 |
| | | | | 125/20 |
| 4,625,464 | A * | 12/1986 | Kubo | B27B 33/20 |
| | | | | 30/92 |
| 5,848,930 | A * | 12/1998 | Jones | B23D 47/12 |
| | | | | 83/489 |
| 8,820,205 | B1 * | 9/2014 | Smith | B23D 45/042 |
| | | | | 83/564 |
| 2006/0084364 | A1 * | 4/2006 | Toncelli | B28D 1/003 |
| | | | | 451/5 |
| 2010/0288098 | A1 * | 11/2010 | Matsuura | B28D 1/26 |
| | | | | 173/90 |
| 2011/0056716 | A1 * | 3/2011 | Jonsson | B28D 1/045 |
| | | | | 318/400.38 |
| 2011/0162210 | A1 * | 7/2011 | Poindexter | B23D 45/126 |
| | | | | 30/95 |
| 2015/0083103 | A1 * | 3/2015 | Calas | B28D 1/043 |
| | | | | 125/14 |
| 2015/0202699 | A1 * | 7/2015 | Makkonen | B25B 5/103 |
| | | | | 30/92 |
| 2016/0032534 | A1 * | 2/2016 | Steck | E01B 31/04 |
| | | | | 83/167 |
| 2018/0104850 | A1 * | 4/2018 | Guazzoni | B28D 1/043 |
| 2019/0039160 | A1 * | 2/2019 | LaGuardia | B23D 61/025 |
| 2021/0260787 | A1 * | 8/2021 | Chartier | B27G 19/04 |
| 2022/0063007 | A1 * | 3/2022 | Widlroither | B23D 59/002 |
| 2022/0161455 | A1 * | 5/2022 | VanDaalwyk | B27B 9/02 |
| 2023/0294197 | A1 * | 9/2023 | Tamminen | B23K 10/00 |
| | | | | 219/121.39 |
| 2024/0416439 | A1 * | 12/2024 | Lee | B28D 1/04 |
| 2025/0205793 | A1 * | 6/2025 | Karlsson | E01B 31/04 |

FOREIGN PATENT DOCUMENTS

| | | |
|---|---|---|
| KR | 10-2012-0006162 | 1/2012 |
| KR | 10-2015-0112636 | 10/2015 |

* cited by examiner

*(a)*

*(b)*

APPARATUS FOR CUTTING CURVED WALL OF REACTOR STRUCTURE

TECHNICAL FIELD

The present invention relates to a cutting apparatus for a curved wall of a structure, and more particularly to a cutting apparatus for a curved wall of a structure configured to accurately cut the curved wall while moving along a guide rail installed on the curved wall of a large structure such as a nuclear power plant containment building.

BACKGROUND ART

As a cutting apparatus of the related art, Korean Patent No. 10-0760869 discloses a cutting apparatus for a concrete pile head, and Korean Patent Laid-Open Publication No. 10-2007-0012177 discloses a cutting apparatus for a pile and a concrete linear structure.

The cutting apparatus for the concrete pile head disclosed in Korean Patent No. 10-0760869 is towed by a crane or the like and is disposed at a construction site. Thereafter, cutting is appropriately performed to cut and dismantle the concrete pile by a technical expert. In this case, a lot of time and effort are required to assemble the cutting apparatus, and an operation of the cutting apparatus is so complicated that it is inconvenient to use the cutting apparatus at an actual construction site.

In addition, since the cutting apparatus for the pile and the concrete linear structure disclosed in Korean Patent Laid-Open Publication No. 10-2007-0012177 may be mounted on an excavator, there is an advantage in that the cutting apparatus is conveniently movable. However, when the ground surface is tilted or sloped, it is difficult for the cutting apparatus to cut a structure horizontally, and a turning angle of the cutting apparatus is limited depending on the ground surface state.

Meanwhile, as another problem, the above-described cutting apparatuses of the related art may not be used to cut a reinforced concrete structure or a metal structure such as a fairly large and tall nuclear power plant containment building.

DISCLOSURE

Technical Problem

Therefore, the present invention has been made in view of the above problems, and it is an object of the present invention to provide a cutting apparatus for a curved wall of a structure configured to accurately cut the curved wall while moving along a guide rail installed on the curved wall of a large structure such as a nuclear power plant containment building.

Technical Solution

In accordance with the present invention, the above and other objects can be accomplished by the provision of a cutting apparatus for a curved wall of a structure, the cutting apparatus including a guide rail mounted on the curved wall of the structure, a chain mounted on the guide rail, a support plate movably supported by a plurality of rollers on the guide rail, a main body case coupled to the support plate, a sprocket mounted on the main body case and rotated by being engaged with the chain, a driving motor mounted in the main body case and configured to rotate the sprocket, a cutting blade rotatably mounted on a front side of the main body case, and a cutting motor mounted on the main body case and configured to rotate the cutting blade.

The roller may be mounted on a roller mounting shaft mounted on the support plate in an angle adjustable manner. The support plate may include a roller shaft mounting part provided on a front side surface of the support plate and configured to allow the roller mounting shaft to be rotatably mounted thereon, a fixing nut coupled to the roller mounting shaft at a rear side of the support plate, and a pair of angle adjustment parts disposed at the rear side of the support plate, each of the angle adjustment parts being coupled to a corresponding one of opposite sides of the roller mounting shaft so as to support the roller mounting shaft.

The sprocket may be disposed to pass through a sprocket through hole formed in the support plate so as to be engaged with the chain.

The cutting apparatus may further include a blade protector coupled to and supported by the main body case and configured to support an upper surface and a lower surface of the cutting blade. The blade protector may include a pair of protective ribs each disposed on a corresponding one of the upper surface and the lower surface of the cutting blade, wherein the protective ribs are spaced apart from each other by a predetermined distance, a protective bracket coupled to the main body case and connected to the pair of protective ribs, and two pairs of adhesive pads mounted in the pair of protective ribs and configured to support the upper surface and the lower surface of the cutting blade.

The two pairs of adhesive pads are each coupled to the pair of protective ribs so as to adjust a space defined between the adhesive pads using a pad coupling member.

The driving motor may be formed of an electric motor, and the cutting motor may be formed of a hydraulic motor.

The plurality of rollers may include a first roller penetratingly mounted on the support plate and configured to perform rolling motion on an upper surface and a lower surface of the guide rail, a second roller mounted on a second roller bracket mounted on an upper corner and a lower corner of the support plate and configured to perform rolling motion on a rear surface of the guide rail, and a third roller penetratingly mounted on the support plate and configured to perform rolling motion on a front surface of the guide rail.

The second roller bracket may be position-adjustably coupled to a second roller mounting part provided at the upper corner and the lower corner of the support plate through a plurality of long holes formed through the second roller bracket. A pair of the third rollers may be mounted on a rotating bracket formed to penetrate the support plate and position-adjustably coupled thereto. The angle adjustment part may include any one of an angle adjustment bolt, a ball joint, and a universal joint. The curved wall of the structure may include a curved wall of a nuclear power plant containment building.

Advantageous Effects

According to a cutting apparatus for a curved wall of a structure, it is possible to accurately cut the curved wall while moving along a guide rail installed on the curved wall of a large structure such as a nuclear power plant containment building.

DESCRIPTION OF DRAWINGS

The above and other objects, features and other advantages of the present invention will be more clearly understood from the following detailed description taken in conjunction with the accompanying drawings, in which:

FIG. 4 is a view showing a support plate and a roller mounting structure according to a first embodiment, in which FIG. 4(a) is a front view and FIG. 4(b) is a horizontal cross-section view;

BEST MODE

Figure 1:
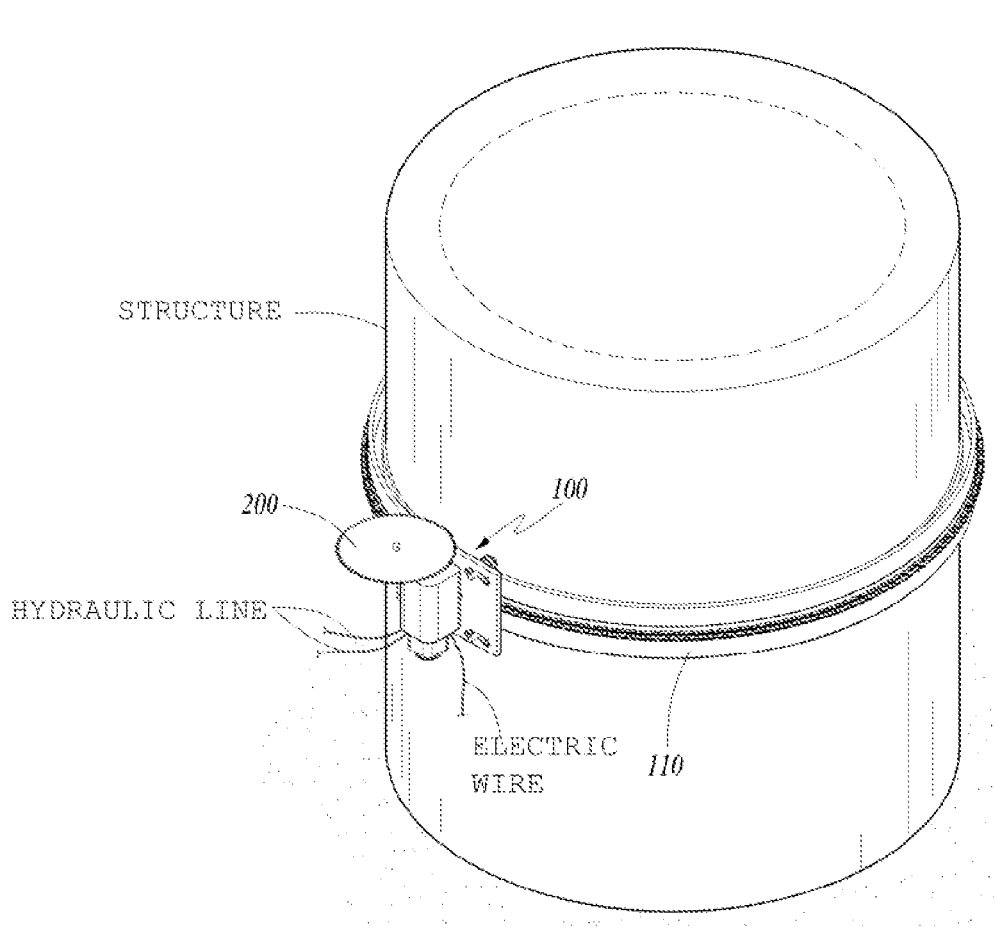
FIG. 1 is a perspective view showing a state in which a cutting apparatus for a curved wall of a structure according to an embodiment of the present invention is installed on the curved wall of the structure.

The present invention may be modified in various ways and may have various embodiments, and specific embodiments are illustrated in the drawings in detail in the detailed description. However, it should be understood that the present invention is not limited to the specific embodiments, and the specific embodiments include all modifications, equivalents, and substitutes that fall within the spirit and technical scope of the present invention.

Terms used in the present invention are only used to describe specific embodiments and are not intended to limit the present invention. In this specification, an expression in a singular form also includes the plural sense, unless clearly specified otherwise in context. It should be understood that expressions such as "comprise" and "have" in this specification are intended to designate the presence of indicated features, numbers, steps, operations, components, parts, or combinations thereof, but do not exclude the presence or addition of one or more features, numbers, steps, operations, components, parts, or combinations thereof.

Hereinafter, reference will now be made in detail to the preferred embodiments of the present invention, examples of which are illustrated in the accompanying drawings. Wherever possible, the same reference numbers will be used throughout the drawings to refer to the same or like parts, and redundant descriptions thereof will be omitted. In describing the embodiments disclosed herein, when it is determined that a detailed description of publicly known techniques to which the invention pertains may obscure the gist of the present invention, the detailed description will be omitted. Further, some components are exaggerated, omitted, or schematically shown in the accompanying drawings.

Figure 2:
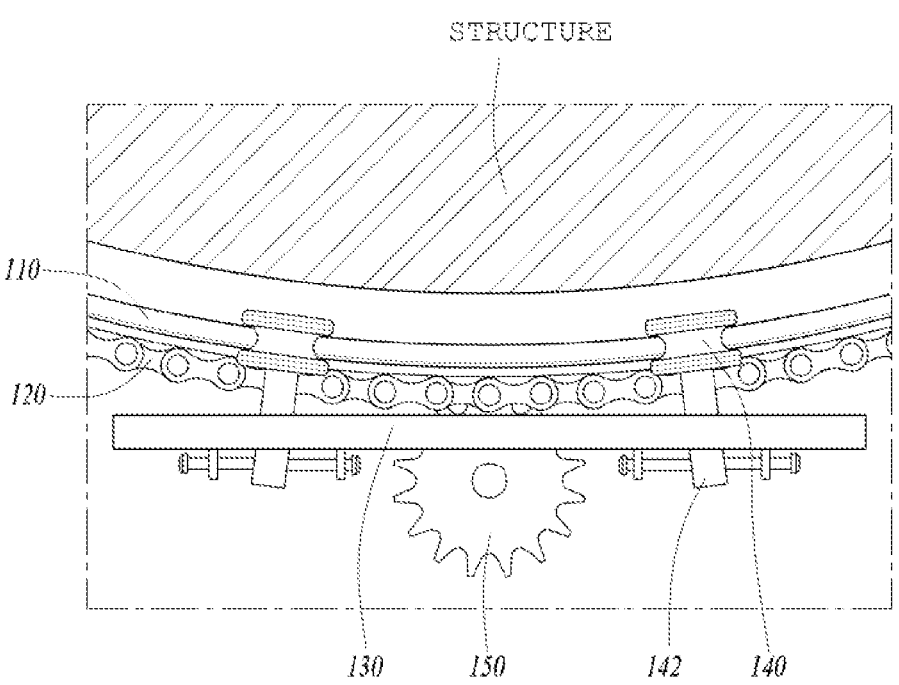
FIG. 2 is a horizontal cross-sectional view showing a state in which rollers are mounted on a guide rail mounted on the structure.
Figure 3:
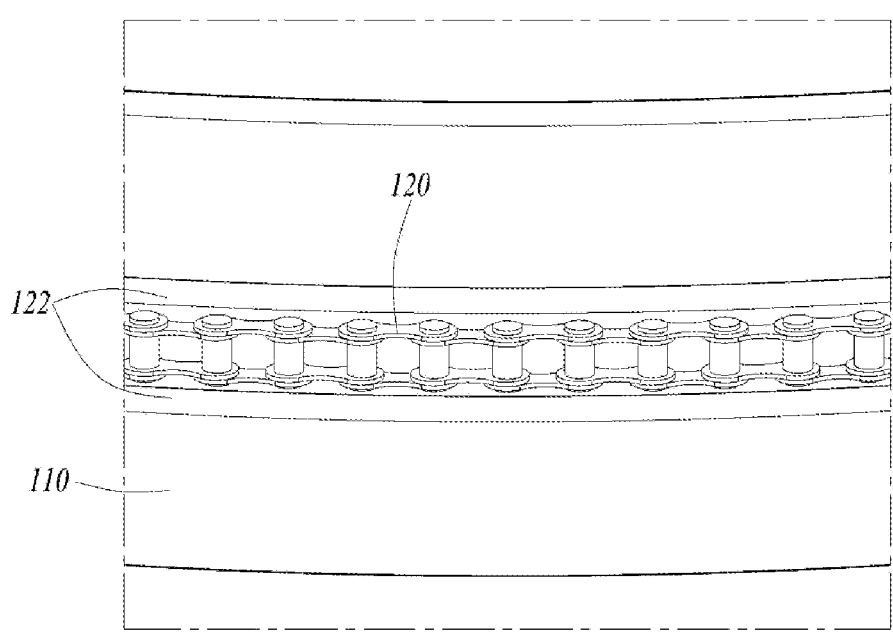
FIG. 3 is a front view showing a chain mounted on the guide rail.
Figure 4:
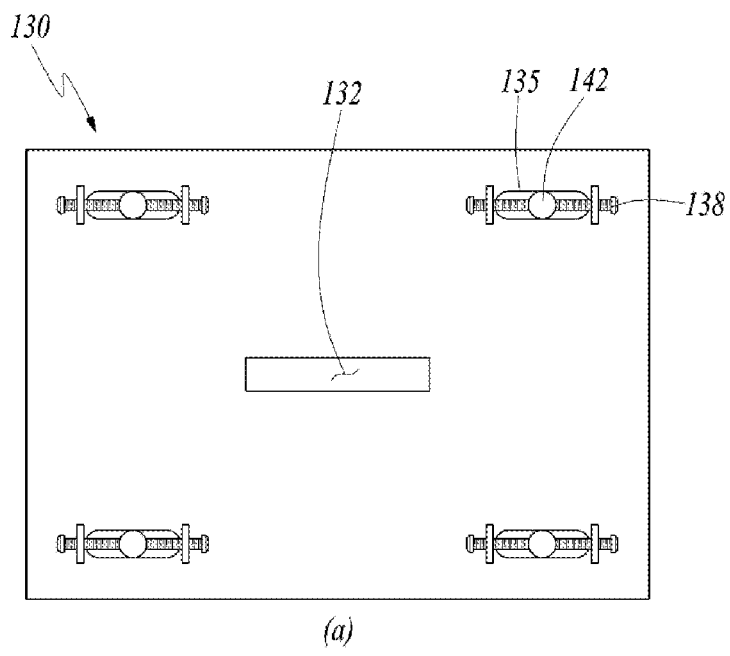
Figure 4:
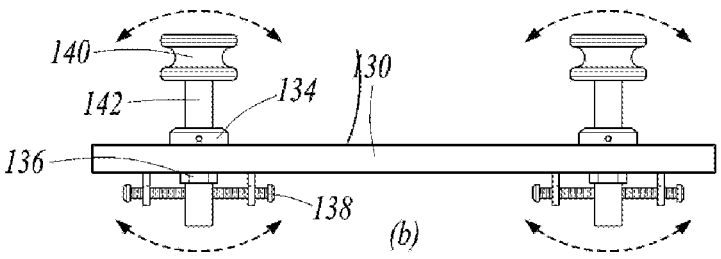
Figure 5:
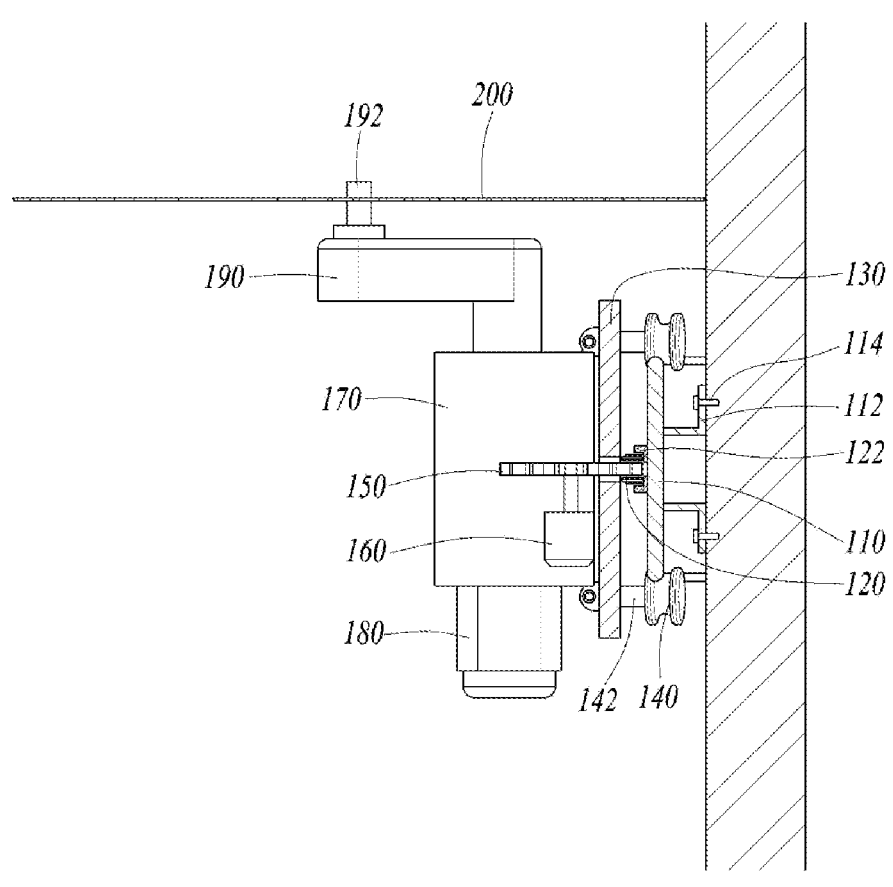
FIG. 5 is a side view showing a state in which the cutting apparatus for the curved wall of the structure according to the embodiment of the present invention is installed on the curved wall of the structure.

FIG. 1 is a perspective view showing a state in which a cutting apparatus for a curved wall of a structure according to an embodiment of the present invention is installed on the curved wall of the structure, FIG. 2 is a horizontal cross-sectional view showing a state in which rollers are mounted on a guide rail mounted on the structure, FIG. 3 is a front view showing a chain mounted on the guide rail, FIG. 4 is a view showing a support plate and a roller mounting structure according to a first embodiment, in which FIG. 4(a) is a front view and FIG. 4(b) is a horizontal cross-section view, and FIG. 5 is a side view showing a state in which the cutting apparatus for the curved wall of the structure according to the embodiment of the present invention is installed on the curved wall of the structure.

A cutting apparatus for a curved wall of a structure 100 according to an embodiment of the present invention includes a guide rail 110 mounted on the curved wall of the structure, a chain 120 mounted on the guide rail, a support plate 130 movably supported by a plurality of rollers 140 on the guide rail, a main body case 170 coupled to the support plate, a sprocket 150 mounted on the main body case and rotated by being engaged with the chain, a driving motor 160 mounted in the main body case and configured to rotate the sprocket, a cutting blade 200 rotatably mounted on the front side of the main body case, and a cutting motor 180 mounted on the main body case and configured to rotate the cutting blade.

The cutting apparatus for the curved wall of the structure 100 of the present invention may cut a curved wall of a reinforced concrete structure or a metal structure such as a fairly large and tall nuclear power plant containment building. A side wall of this structure may have a cylindrical side shape with a constant radius of curvature, and a top wall thereof may have a dome shape. The cutting apparatus for the curved wall of the structure 100 of the present invention may cut any type of curved wall if a guide rail is installed along the curved wall regardless of whether the radius of curvature of the curved wall is constant or variable depending on the shape of the curved wall.

As shown in FIGS. 1, 2, and 5, the guide rail 110 may be mounted on the curved wall of the structure in a state of being spaced apart from the curved wall by a predetermined distance. The guide rail 110 may be formed in a curved rib shape according to the shape of the curved wall of the structure. The guide rail 110 has a plurality of rail fixing brackets 112 each coupled thereto at a predetermined interval, and the guide rail 110 may be installed on the curved wall of the structure by mounting an anchor bolt 114 on the curved wall through the rail fixing bracket 112.

As shown in FIGS. 2, 3, and 5, the chain 120 may be mounted on the outer peripheral surface of the guide rail 110. The chain 120 may be fixed to an intermediate height of the guide rail 110 by upper and lower chain fixing guides 122. A pair of the chain fixing guides 122 may be coupled to the surface of the guide rail 110 at a predetermined distance from each other. The chain fixing guide 122 further includes a plurality of support ribs (not shown) each supporting an upper portion of the chain 120, thereby preventing the chain 120 from being separated from the chain fixing guides 122. The chain fixing guides 122 may be continuously mounted on the guide rail 110, or the plurality of chain fixing guides 122 may be arranged at predetermined intervals.

As shown in FIGS. 4 and 5, the support plate 130 is formed in the shape of a rectangular plate and is movably supported on the guide rail 110 by the plurality of rollers 140. The support plate 130 has four rollers 140 each provided thereon and configured to change a mounting angle of a rotation shaft thereof. Therefore, the rotation shaft of each roller 140 may be mounted so as to be disposed perpendicular to the guide rail 110 which is the curved wall.

The main body case 170 is coupled to the support plate 130. Here, the main body case 170 may have the driving motor 160 mounted on the inner side thereof and the cutting motor 180 mounted on the outer side thereof. The overall outer shape of the main body case 170 may be formed in a rectangular parallelepiped shape.

As shown in FIG. 5, the sprocket 150 may be mounted in the main body case 170, and a part of the sprocket 150 may be disposed to pass through the support plate 130 so as to be engaged with the chain 120. To this end, as shown in FIG. 4(a), a sprocket through hole 132 may be formed in a central portion of the support plate 130.

As shown in FIG. 5, the driving motor 160 is mounted in the main body case 170 and rotates the sprocket 150, thereby making it possible to move the cutting apparatus 100 on the guide rail 110. Although not shown in the drawing, a driving shaft of the driving motor 160 may be connected to a rotation shaft of the sprocket 150 through a speed reducer. The driving motor 160 is provided to slide in a direction of the wall surface using a support (not shown) within the main body case 170 and is fixed within the main body case 170 by a bolt (not shown). The sprocket 150 axially coupled to one side of an upper portion of the driving motor 160 is also provided to be able to slide in the direction of the wall surface, thereby making it possible to adjust a joint distance between the sprocket 150 and the chain 120 fixedly installed on the wall surface.

The cutting blade 200 may be rotatably mounted on the front side of the main body case 170. The cutting blade 200 may be formed in the shape of a circular disk and may have a plurality of grooves each formed at a predetermined interval on an edge portion thereof. A rotation shaft of the cutting blade 200 may be mounted directly on the main body case 170. Alternatively, the rotation shaft thereof may be rotatably mounted on a blade mounting part 190 rotatably mounted on the main body case 170. The blade mounting part 190 is rotatable relative to the main body case 170. Accordingly, when the cutting apparatus 100 is installed, the cutting apparatus 100 may be mounted on the guide rail 110 in a state in which the cutting blade 200 is spaced apart from the curved wall of the structure.

As shown in FIG. 5, the cutting motor 180 is mounted on the outside of the main body case 170. Specifically, the cutting motor is mounted on the lower side of the main body case 170 so as to rotate the cutting blade 200. To this end, a driving shaft of the cutting motor 180 may be connected to the rotation shaft of the cutting blade 200 via the main body case 170 and the blade mounting part 190.

As shown in FIGS. 4 and 5, the roller 140 may be mounted on a roller mounting shaft 142 mounted on the support plate 130 in an angle adjustable manner. The roller 140 may have a groove formed in the circumferential surface thereof and configured to allow a corner portion of the support plate 130 to be inserted thereinto. The roller mounting shaft 142 may pass through a long hole 135 formed in the support plate 130 and may be mounted to be able to adjust the angle relative to the support plate 130. The roller 140 may be rotatably mounted on the roller mounting shaft 142 fixed to the support plate 130 at a predetermined angle.

The support plate 130 may include a roller shaft mounting part 134 provided on the front side surface of the support plate 130 and configured to allow the roller mounting shaft 142 to be rotatably mounted thereon, a fixing nut 136 coupled to the roller mounting shaft 142 at the rear side of the support plate 130, and a pair of angle adjustment parts (for example, a pair of angle adjustment bolts) 138 each coupled to a corresponding one of opposite sides of the roller mounting shaft 142 at the rear side of the support plate 130 so as to support the roller mounting shaft 142. Here, the angle adjustment bolt 138 is described, but a ball joint or a universal joint may be provided as another example. Hereinafter, for convenience of description, the angle adjustment bolt 138 will be described.

The roller shaft mounting part 134 may protrude forwards from or may be coupled to the front side of the long hole 135 formed in the support plate 130. The roller shaft mounting part 134 may be provided in a pair, and each of the roller shaft mounting parts 134 may be provided at a corresponding one of upper and lower portions of the roller mounting shaft 142 so that the roller mounting shaft 142 is rotatable on a horizontal plane. The pair of roller shaft mounting parts 134 and the roller mounting shaft 142 each have a hole formed therein and configured to allow a rotation pin to be inserted thereinto. Here, the rotation pin is inserted into the hole, thereby enabling the roller mounting shaft 142 to be rotatably mounted on the support plate 130.

The fixing nut 136 is coupled to a rear end of the roller mounting shaft 142, in which the rear end passes through the long hole 135 in the support plate 130 and protrudes rearwards. In this manner, the roller mounting shaft 142 may be fixed to the support plate 130 at a predetermined angle.

Additionally, the pair of angle adjustment bolts 138 may be coupled to a pair of brackets provided on opposite sides of the rear end of the roller mounting shaft 142 protruding from the rear side of the support plate 130. The pair of angle adjustment bolts 138 is coupled to the roller mounting shaft 142 so as to support the rear end of the roller mounting shaft 142 disposed between the pair of brackets on opposite sides of the roller mounting shaft 142, thereby making it possible not only to support the roller mounting shaft 142 disposed at a predetermined angle relative to the support plate 130, but also to maintain the mounting angle of the roller mounting shaft 142.

As shown in FIG. 4(a), the sprocket 150 may be disposed to be engaged with the chain 120 by passing through the sprocket through hole 132 formed in the support plate 130. The rotation shaft of the sprocket 150 is mounted in the main body case 170, and the sprocket through hole 132 may be formed in the shape of a rectangular hole having a length greater than an outer diameter of the sprocket 150. Accordingly, the sprocket 150 passes through the sprocket through hole 132 of the support plate 130, and teeth on the outer peripheral surface of the sprocket 150 are engaged and rotated with the chain 120, thereby enabling the main body case 170 to be moved along the guide rail 110.

Figure 6:
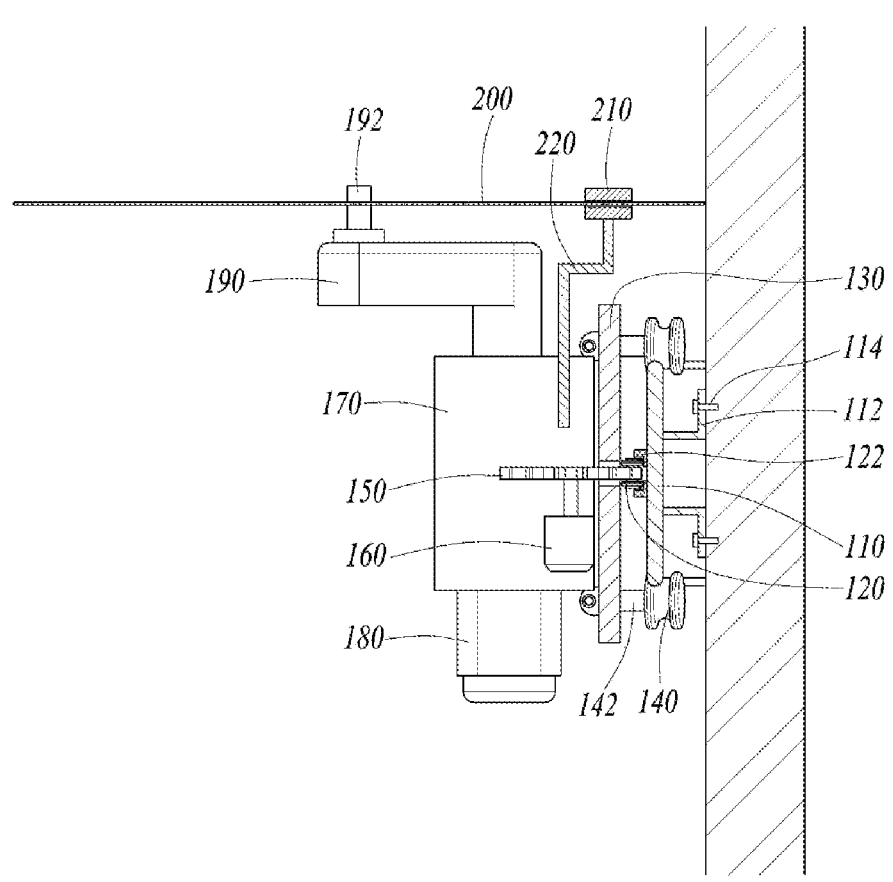
FIG. 6 is a side view schematically showing a blade protector mounting structure in the cutting apparatus for the curved wall of the structure according to the embodiment of the present invention.
Figure 7:
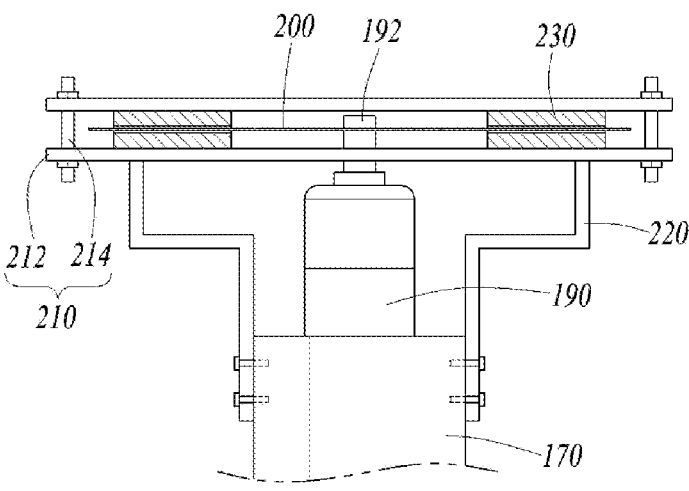
FIG. 7 is a horizontal cross-sectional view schematically showing the blade protector mounting structure in the cutting apparatus for the curved wall of the structure according to the embodiment of the present invention.
Figure 8:
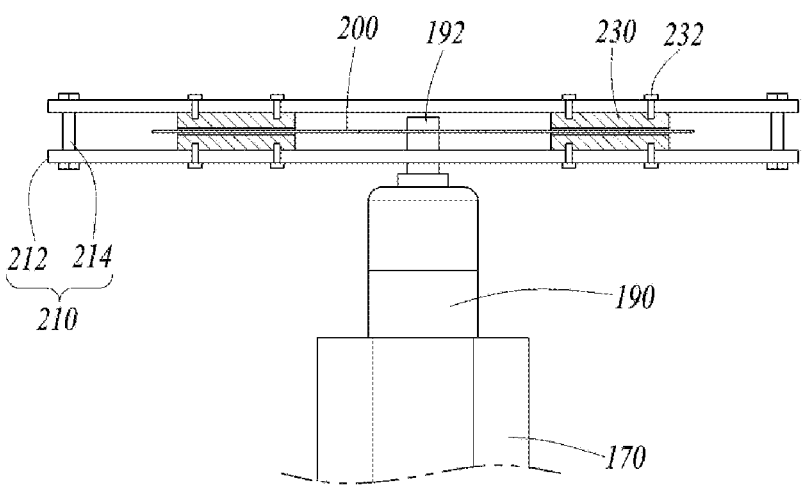
FIG. 8 is a horizontal cross-sectional view showing a coupling structure of an adhesive pad in the blade protector mounting structure in FIG. 7.

FIG. 6 is a side view schematically showing a blade protector mounting structure in the cutting apparatus for the curved wall of the structure according to the present invention, FIG. 7 is a horizontal cross-sectional view schematically showing the blade protector mounting structure apparatus for the curved wall of the structure according to the present invention, and FIG. 8 is a horizontal cross-sectional view showing a coupling structure of an adhesive pad in the blade protector mounting structure shown in FIG. 7.

The cutting apparatus for the curved wall of the structure 100 according to the present invention may further include a blade protector 210 coupled to and supported by the main body case 170 and configured to support the upper and lower surfaces of the cutting blade 200.

Since the cutting blade 200 has a fairly large radius and rotates at high speed to cut a reinforced concrete curved wall, a cutting portion of an edge portion of the cutting blade 200 may be elastically deformed in a direction of the rotation shaft or may cause occurrence of significant vibration. The blade protector 210 may minimize vibration of the edge portion of the cutting blade 200 by closely supporting the upper and lower surfaces of the cutting blade 200.

As shown in FIGS. 7 and 8, the blade protector 210 may include a pair of protective ribs 212 each disposed on a corresponding one of the upper and lower surfaces of the cutting blade 200, in which the protective ribs 212 are spaced apart from each other by a predetermined distance, a protective bracket 220 coupled to the main body case 170 and connected to the pair of protective ribs 212, and two pairs of adhesive pads 230 mounted in the pair of protective ribs 212 and configured to support the upper and lower surfaces of the cutting blade 200.

The pair of protective ribs 212 may have an elongated rectangular rib shape having a length greater than a diameter of the cutting blade 200. The pair of protective ribs 212 may be maintained to be spaced apart from each other at a predetermined distance by including a pair of coupling members 214 each coupled to a corresponding one of the opposite ends of the pair of protective ribs 212.

The pair of protective brackets 220 may be disposed between the main body case 170 and one protective rib 212. Each of the protective brackets 220 may have one end coupled to a corresponding one of opposite side surfaces of the main body case 170 with a plurality of screws, and each of the protective brackets 220 may have the other end welded and coupled to a corresponding one of opposite sides of the lower surface of the protective rib 212.

The two pairs of adhesive pads 230 may be coupled to the inner surface of the pair of protective ribs 212 and may be disposed to slidably contact the surface of the rotating cutting blade 200. Each of the adhesive pads 230 is formed of a metal alloy material having low friction, thereby making it possible to slidably support the upper and lower surfaces of the cutting blade 200.

The two pairs of adhesive pads 230 may be each coupled to the pair of protective ribs 212 so as to adjust a space defined between the adhesive pads 230 using a pad coupling member 232.

The cutting blade 200 may have various diameters and thicknesses depending on the size, shape, and material of a wall of a structure to be cut. Therefore, each adhesive pad 230 may be fixed to contact the surface of the cutting blade 200 having various thicknesses by at least two pad coupling members 232.

Meanwhile, the driving motor 160 may be formed of an electric motor, and the cutting motor 180 may be formed of a hydraulic motor.

As shown in FIG. 1, the cutting apparatus 100 may have an electric wire connected thereto and adopted to supply power thereto. Further, the cutting apparatus 100 may have a hydraulic line connected thereto and adopted to operate the cutting motor 180. When the cutting motor 180 is configured as a hydraulic motor, the cutting blade 200 may be rotated with a large torque. Meanwhile, the hydraulic motor is required to have a hydraulic line connected thereto. In the case of a fairly large structure such as a nuclear power plant containment building, a hydraulic line of several tens of meters may be connected to the hydraulic motor. In consideration of the above-described configuration, the cutting motor 180 may also be formed of an electric motor. In this case, only an electric wire needs to be connected to the cutting apparatus 100, and a long and heavy hydraulic line does not need to be connected thereto.

Figure 9:
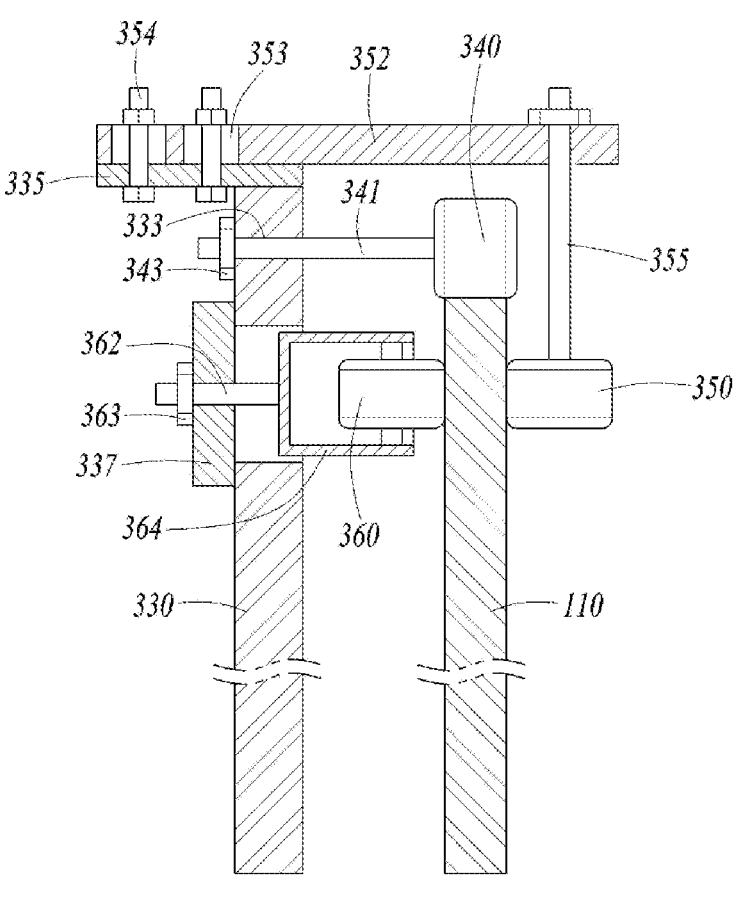
FIG. 9 is a longitudinal cross-sectional view showing a roller mounting structure according to a second embodiment of the present invention on an upper portion of the guide rail.
Figure 10:
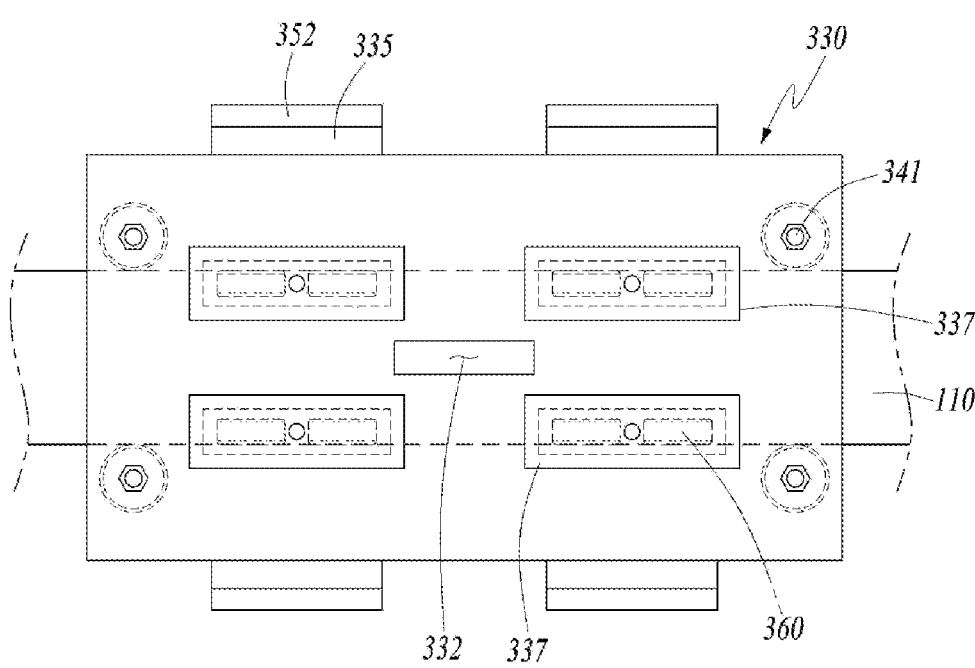
FIG. 10 is a front view showing the support plate and the roller mounting structure according to the second embodiment.
Figure 11:
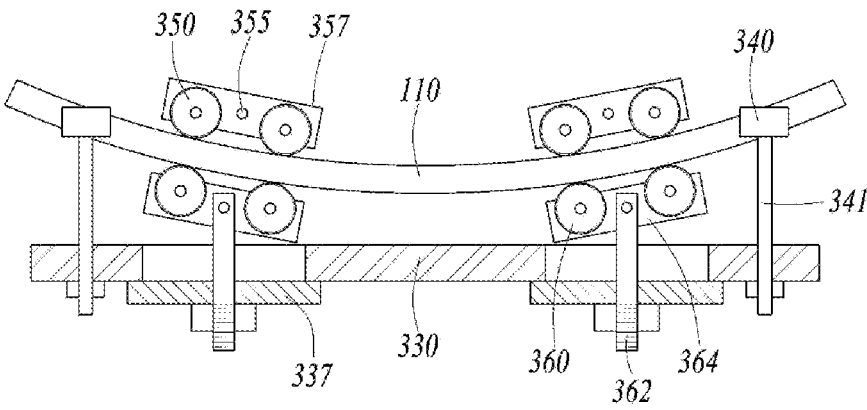
FIG. 11 is a horizontal cross-sectional view showing a state in which rollers according to the second embodiment are mounted on the guide rail.

FIG. 9 is a longitudinal cross-sectional view showing a roller mounting structure according to a second embodiment of the present invention on an upper portion of the guide rail, FIG. 10 is a front view showing the support plate and the roller mounting structure according to the second embodiment, and FIG. 11 is a horizontal cross-sectional view showing a state in which rollers according to the second embodiment are mounted on the guide rail.

As compared with the roller mounting structure having one roller according to the first embodiment, the roller mounting structure according to the second embodiment of the present invention has three rollers supported by the upper, lower, rear, and front surfaces of the guide rail 110.

In the roller mounting structure according to the second embodiment, a plurality of rollers may include a first roller 340 penetratingly mounted on a support plate 330 and configured to perform rolling motion on the upper and lower surfaces of the guide rail 110, a second roller 350 mounted on a second roller bracket 352 mounted on upper and lower corners of the support plate 330 and configured to perform rolling motion on the rear surface of the guide rail 110, and a third roller 360 penetratingly mounted on the support plate 330 and configured to perform rolling motion on the front surface of the guide rail 110.

Although the support plate 330 of the second embodiment has a rectangular plate shape similar to that of the support plate 130 of the first embodiment, there is a difference in that the support plate 330 further includes a first roller through hole 333, a second roller mounting part 335, and a third roller mounting part 337.

The first roller 340 may be rotatably mounted on a first roller shaft 341 fixed in the first roller through hole 333 formed through four vertices of the support plate 330. The first roller shaft 341 has a thread formed on the outer peripheral surface of the upper end thereof, thereby making it possible to be engaged with and fixed to a nut 343. Additionally, the position of the first roller 340 mounted on the other end of the first roller shaft 341 may be adjusted by changing the coupling position of the nut 343.

The second roller 350 is mounted on each of the four second roller brackets 352 respectively mounted on the upper and lower corners of the support plate 330 so as to perform rolling motion on the rear surface of the guide rail 110. A second roller shaft 355 may be penetratingly mounted at the rear end of each second roller bracket 352 so as to be engaged with a nut. The second roller 350 may be rotatably mounted on the end of the second roller shaft 355.

The third roller 360 has four pairs of rollers each mounted at a position closer to a central portion of the support plate 330 than the first roller 340, thereby making it possible to perform rolling motion on the front surface of the guide rail 110. The support plate 330 has four through holes formed therein, and each of the third roller mounting parts 337 may be coupled to a corresponding one of the four through holes. Here, the third roller mounting part 337 is formed to be larger than the through hole. The third roller mounting part 337 has a bracket mounting shaft 362 penetratingly mounted thereon. Here, the bracket mounting shaft 362 is coupled to and fixed by a nut 363.

As shown in FIG. 10, the support plate 330 has a sprocket through hole 332 formed in a central portion thereof, thereby enabling the sprocket 150 to pass through the support plate 330 and to be engaged with the chain 120. In FIG. 11, the sprocket through hole 332, the sprocket 150, and the chain 120 are omitted.

In FIG. 9, although the first roller 340, the second roller 350, and the third roller 360 are supported by the upper portion of the guide rail 110, the first roller 340, the second roller 350, and the third roller 360 may also be supported by the lower portion of the guide rail 110 in a symmetrical manner.

As shown in FIG. 9, the second roller bracket 352 may be position-adjustably coupled to the second roller mounting part 335 provided at the upper and lower corners of the support plate 330 through a plurality of long holes 353 formed through the second roller bracket 352. The second roller mounting part 335 in the shape of a rectangular plate having a plurality of coupling holes formed therein may be welded and coupled to the upper and lower surfaces of the support plate 330. Four second roller mounting parts 335 may be respectively provided on the left and right sides of the upper surface and the left and right sides of the lower surface of the support plate 330. The second roller bracket 352 has a plurality of long holes 353 penetratingly formed therein and configured to enable the second roller bracket 352 to be coupled to the second roller mounting part 335 using coupling members 354 such as bolts and nuts. Here, the second roller bracket 352 is position-adjustably coupled to the second roller mounting part 335, thereby adjusting a distance from the support plate 330 to the roller 350. In this manner, the roller 350 may be brought into close contact with the rear surface of the guide rail 110.

As shown in FIGS. 9 to 11, a pair of third rollers 360 may be mounted on a rotating bracket 364 formed to penetrate the support plate 330 and coupled thereto in a positionally adjustable manner. The rotating bracket 364 may be rotatably mounted on the bracket mounting shaft 362 penetratingly coupled to the third roller mounting part 337 by the nut 363. Since the guide rail 110 is provided in the form of a curved plate, the rotating bracket 364 having the pair of third rollers 360 each mounted on a corresponding one of the left and right sides thereof is rotatably connected to the bracket mounting shaft 362, thereby allowing the pair of third rollers 360 to be in close contact with the front surface of the guide rail 110 and to be supported by the same. Additionally, a rotation space may be provided on the rear surface side of the support plate 330 in the form of a groove or a through hole so as to prevent interference during rotation of the rotating bracket 364.

As shown in FIG. 11, a pair of second rollers 350 may be also mounted on a rotating bracket 357, and the rotating bracket 357 may be rotatably mounted on the second roller shaft 355. As a result, the pair of second rollers 350 may be in close contact with the rear surface of the guide rail 110 having a curved plate shape and may be supported by the same.

According to the roller mounting structure of the second embodiment of the present invention, rollers are respectively supported by the upper, lower, rear, and front surfaces of the guide rail, thereby making it possible to reliably prevent the cutting apparatus for the curved wall of the structure from falling off the guide rail. In this manner, the cutting apparatus may be smoothly moved along the guide rail.

Although preferred embodiments of the present invention have been disclosed for illustrative purposes, those skilled in the art will appreciate that the present invention may be modified and changed in various ways by adding, changing, deleting, or adding components, without departing from the scope and spirit of the present invention as disclosed in the accompanying claims. Further, it is noted that such modifications and variations are intended to be included within the scope of the present invention.

REFERENCE NUMERAL LIST

100: Cutting apparatus for curved wall of structure 110: Guide rail

112: Rail fixing bracket 114: Anchor bolt 120: Chain 122: Chain fixing guide

130: Support plate 132: Sprocket through hole 134: Roller shaft mounting part 135: Long hole 136: Fixing nut 138: Angle adjustment bolt 140: Roller 142: Roller mounting shaft 150: Sprocket 160: Driving motor 170: Main body case 180: Cutting motor 190: Blade mounting part 192: Blade rotation shaft 200: Cutting blade 210: Blade protector 212: Protective rib 214: Coupling member 220: Protective bracket 230: Adhesive pad 232: Pad coupling member 330: Support plate 332: Sprocket through hole 333: First roller through hole 335: Second roller mounting part 337: Third roller mounting part 340: First roller 341: First roller shaft 343: Nut 350: Second roller 352: Second roller bracket 353: Long hole 354: Coupling member 355: Second roller shaft 357: Rotating bracket 360: Third roller 362: Bracket mounting shaft 363: Nut 364: Rotating bracket

INDUSTRIAL APPLICABILITY

A cutting apparatus for a curved wall of a nuclear power plant structure is industrially usable for construction work, structure demolition, and drilling at a construction site.

The invention claimed is:

1. A cutting apparatus for a curved wall of a structure, the cutting apparatus comprising:
    a guide rail mounted on the curved wall of the structure;
    a chain mounted on the guide rail;
    a support plate movably supported by a plurality of rollers on the guide rail;
    a main body case coupled to the support plate;
    a sprocket mounted on the main body case and rotated by being engaged with the chain;
    a driving motor mounted in the main body case and configured to rotate the sprocket;
    a cutting blade rotatably mounted on a front side of the main body case; and
    a cutting motor mounted on the main body case and configured to rotate the cutting blade.

2. The cutting apparatus according to claim 1, wherein the roller is mounted on a roller mounting shaft mounted on the support plate in an angle adjustable manner.

3. The cutting apparatus according to claim 2, wherein the support plate comprises:
    a roller shaft mounting part provided on a front side surface of the support plate and configured to allow the roller mounting shaft to be rotatably mounted thereon;

a fixing nut coupled to the roller mounting shaft at a rear side of the support plate; and a pair of angle adjustment parts disposed at the rear side of the support plate, each of the angle adjustment parts being coupled to a corresponding one of opposite sides of the roller mounting shaft so as to support the roller mounting shaft.

4. The cutting apparatus according to claim 1, wherein the sprocket is disposed to pass through a sprocket through hole formed in the support plate so as to be engaged with the chain.

5. The cutting apparatus according to claim 1, further comprising a blade protector coupled to and supported by the main body case and configured to support an upper surface and a lower surface of the cutting blade.

6. The cutting apparatus according to claim 5, wherein the blade protector comprises:

a pair of protective ribs each disposed on a corresponding one of the upper surface and the lower surface of the cutting blade, wherein the protective ribs are spaced apart from each other by a predetermined distance;

a protective bracket coupled to the main body case and connected to the pair of protective ribs; and two pairs of adhesive pads mounted in the pair of protective ribs and configured to support the upper surface and the lower surface of the cutting blade.

7. The cutting apparatus according to claim 6, wherein the two pairs of adhesive pads are each coupled to the pair of protective ribs so as to adjust a space defined between the adhesive pads using a pad coupling member.

8. The cutting apparatus according to claim 1, wherein the driving motor is formed of an electric motor, and the cutting motor is formed of a hydraulic motor.

9. The cutting apparatus according to claim 1, wherein the plurality of rollers comprise:

a first roller penetratingly mounted on the support plate and configured to perform rolling motion on an upper surface and a lower surface of the guide rail;

a second roller mounted on a second roller bracket mounted on an upper corner and a lower corner of the support plate and configured to perform rolling motion on a rear surface of the guide rail; and a third roller penetratingly mounted on the support plate and configured to perform rolling motion on a front surface of the guide rail.

10. The cutting apparatus according to claim 9, wherein the second roller bracket is position-adjustably coupled to a second roller mounting part provided at the upper corner and the lower corner of the support plate through a plurality of long holes formed through the second roller bracket.

11. The cutting apparatus according to claim 9, wherein a pair of the third rollers is mounted on a rotating bracket formed to penetrate the support plate and position-adjustably coupled thereto.

12. The cutting apparatus according to claim 3, wherein the angle adjustment part comprises any one of an angle adjustment bolt, a ball joint, and a universal joint.

13. The cutting apparatus according to claim 1, wherein the curved wall of the structure comprises a curved wall of a containment nuclear power plant building.

\* \* \* \* \*